Sept. 18, 1962 W. H. LYON 3,054,861

AUTOMATIC SYNCHRONOUS CLUTCH FOR MAGNETIC RECORDER-REPRODUCER EQUIPMENT

Original Filed Aug. 27, 1953 2 Sheets-Sheet 1

INVENTOR.
WILLIAM H. LYON
BY
H. G. Manning
ATTORNEY

INVENTOR
William H. Lyon

United States Patent Office 3,054,861
Patented Sept. 18, 1962

3,054,861

AUTOMATIC SYNCHRONOUS CLUTCH FOR MAGNETIC RECORDER-REPRODUCER EQUIPMENT

William H. Lyon, Orange, Conn., assignor to The Sound-Scriber Corporation, North Haven, Conn.

Continuation of application Ser. No. 376,961, Aug. 27, 1953. This application Sept. 24, 1959, Ser. No. 842,112
6 Claims. (Cl. 179—100.2)

This invention relates to sound recording and reproducing apparatus, and more particularly to an automatic synchronous clutch mechanism for magnetic recording apparatus in which the sound is recorded with multiple tracks. The invention is more particularly adapted to a system in which the recording is performed transversely by a plurality of transducer heads on a turntable which produces a series of spaced arcuate tracks upon a wide flexible strip of tape covered on one side with an emulsion of magnetic particles.

One object of the present invention is to provide an automatic synchronous clutch of the above nature which will permit the operator to move the tape during reproduction in either direction at will without loss of synchronization of the playback heads with the tracks, or of channel identification in case two channels are being reproduced from alternate tracks on the same tape.

A further object is to provide a device of the above nature in which the clutch may be slipped in either direction permitting the tape feed roller to be turned either forwardly or backwardly as desired.

A further object is to provide an automatic synchronous clutch mechanism of the above nature, in which a driven gear is secured solidly to a toothed clutch in such a way that the turning of the clutch by one tooth exactly coincides with one quarter revolution of a four-head turntable, representing one sound track for a single channel apparatus, or two sound tracks of an eight-head turntable for a dual channel apparatus.

A further object is to provide an apparatus of the above nature which will be simple in construction, inexpensive to manufacture, easy to install and manipulate, compact, ornamental in appearance, and very efficient and durable in use.

The present invention relates to an improvement over the inventions disclosed in an application of Lincoln Thompson, Frank E. Runge and William H. Lyon, Serial No. 255,184, filed November 7, 1951, entitled, "Long-Playing Magnetic Tape Recorder," patented June 12, 1956, No. 2,750,449; an application of William H. Lyon, Serial No. 284,716, filed April 28, 1952, entitled, "Automatic Synchronization Apparatus for Long Time Transverse Magnetic Sound Recorder and Reproducer," patented November 27, 1956, No. 2,772,328; and an application of Lincoln Thompson, Frank E. Runge and William H. Lyon, Serial No. 327,834, filed December 24, 1952, entitled "Scanning Mechanism for Magnetic Tape Recording," patented April 24, 1956, No. 2,743,319.

This application is a continuation of my prior original copending application Serial No. 376,961, filed August 27, 1953 for improvement in "Automatic Synchronous Clutch for Magnetic Recorder-Reproducer Equipment," which prior original application will now be permitted to lapse without prejudice, in view of its being superseded by the present application.

In reproducing magnetic tape recordings of the multiple track type, it is frequently desirable to run the tape backward a few seconds to repeat a portion of a message, or to run the tape forward at a rapid rate over blank areas, or over areas where reproduction is not desired.

In attempting to accomplish such results, the synchronization of play-back, or the alignment between the transducer heads and the recorded tracks, will frequently become lost. Also the identity of a sound track on a dual channel equipment may be lost while aligning the recorded tracks with the transducer heads.

An additional difficulty also occurs in reproducing intermittent recordings of only a few words each, because the signal may be passed by before perfect track alignment is achieved.

By means of the present invention, the above and other disadvantages have been avoided.

With these and other objects in view there have been illustrated on the accompanying drawings two forms in which the invention may conveniently be embodied in practice.

Figure 1:
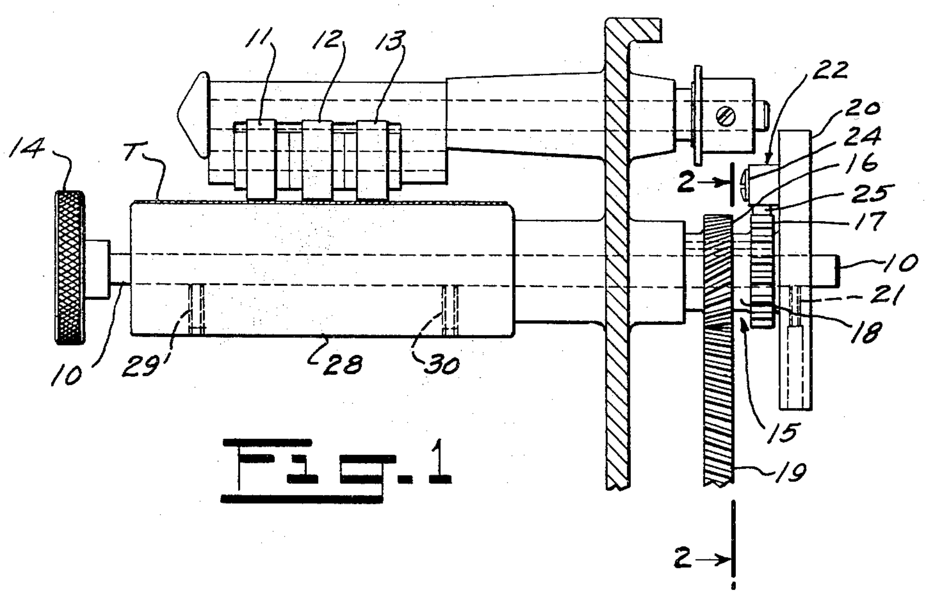
FIG. 1 represents a side view, partly in section, of the synchronizing clutch mechanism.
Figure 2:
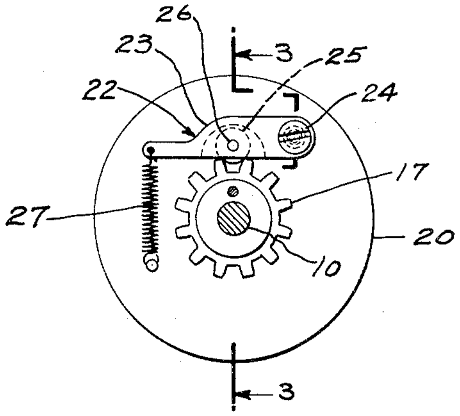
FIG. 2 is a cross-sectional view, taken along the line 2—2 of FIG. 1, looking in the direction of the arrows.

Referring now to the drawings in which like reference numerals denote corresponding parts throughout the several views, the numeral 10 indicates a shaft carrying an elongated feed roller 28 over which the tape T is adapted to be passed while engaged by the pressure rollers 11, 12, and 13, located above said tape.

In order manually to rotate the shaft 10 for advancing the tape forwardly or backwardly as desired, provision is made of a knurled knob 14 on one end of said shaft.

On the other end of the shaft 10, provision is made of a combined clutch and gear member 15 which is free to turn on the shaft 10 and comprises a small gear 16 rigidly pinned to a circular toothed clutch 17—an annular groove 18 being provided between said gear 16 and said clutch 17.

Figure 3:
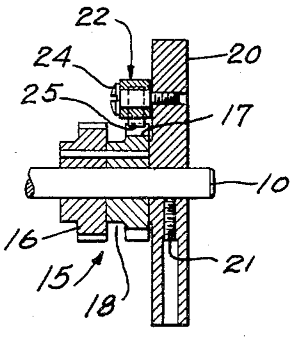
FIG. 3 is a longitudinal sectional view, taken along the line 3—3 of FIG. 2.

The gear 16 meshes with a motor-driven gear 19, and transmits rotary motion indirectly to the shaft 10 by means of a small roller 25 engaging a pair of adjacent teeth of the clutch 17. The roller 25 is mounted on a pin 26 secured to a central portion of an elongated lever 23 of a dog 22, said lever being pivoted on a screw 24 to a driving wheel 20 rigidly secured to the shaft 10 by a set screw 21 (FIG. 3). A coiled spring 27 connects the free end of the lever 23 to the wheel 20, and urges the small roller 25 against the teeth of the clutch 17. The elongated feed roller 28 is detachably secured to the shaft 10 by a pair of set screws 29 and 30 (FIG. 1).

By means of this construction, the tape T will normally be driven in a forward direction by the feed roller, but may manually be fed in either direction whenever desired by manipulating the knob 14 independently of the gear 19.

In normal operation, the roller 25 will wedge firmly between two adjacent teeth of the clutch 17, and will transmit the power received from the motor-driven gears 19 and 16 through the clutch 17, the roller 25, and the dog lever 23 to the drive wheel 20 for feeding the tape T without slipping.

When the knob 14 is manually twisted for moving the tape in either direction, the dog roller 25 will be caused to snap from tooth to tooth of the clutch 17. The feed roller 28 will thus be permitted to rotate and override the gears 19 and 16. However, since the dog roller 25 will engage the clutch 17 only upon a pair of adjacent teeth, the tape T can stop only at points of the recorded tracks which are in exact synchronism with the transducer heads of the turntable, not shown. This is due to the fact that the angular spacing of the teeth corresponds to the distance between two adjacent sound tracks for a single channel machine, or between alternate sound tracks for a dual channel machine.

In other words, the movement of the tape T produced by manually turning the feed roller knob 14, will result in changing the position of the tape, backwardly or forwardly, by exactly one sound track or a multiple thereof on a single channel apparatus. Also, on a dual channel machine the tape will be moved manually a distance equal to two sound tracks or a multiple thereof. It will thus be seen that synchronization between the transducer heads and the recording tracks will be positively maintained at all times, and the heads cannot stop between said tracks at any time.

Figure 4:
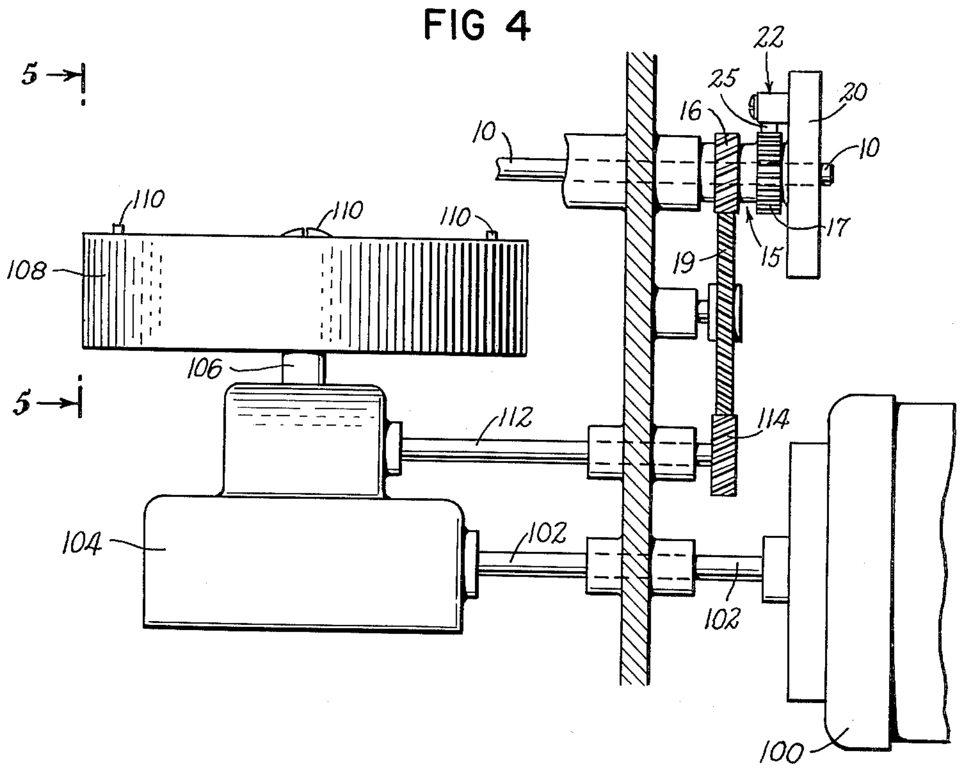
FIGURE 4 is a schematic side view, partly in section, of the mechanism which normally drives the rotating heads and the tape drive roller.
Figure 5:
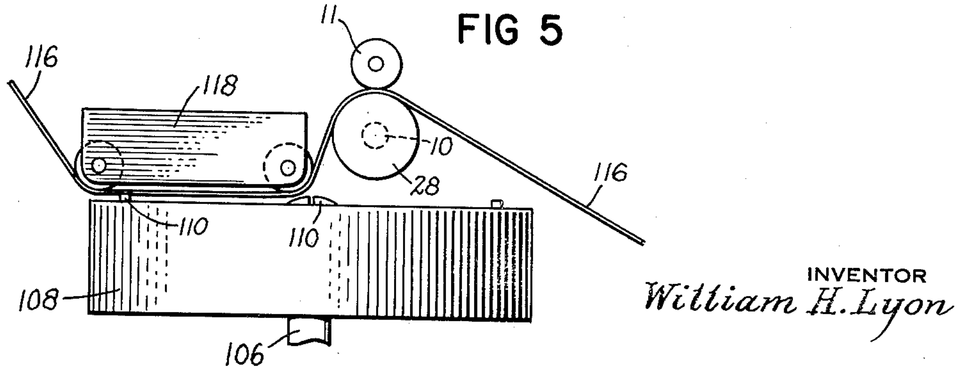
FIGURE 5 is a schematic front view of the rotating heads and the tape drive roller, showing the path of tape travel.

Referring now to FIGURE 4, a mechanism for driving the rotating heads in synchronism with the tape feed, similar to that disclosed in U.S. Patent No. 2,743,319, includes a drive motor 100 with a shaft 102 extending into gearbox assembly 104. An output shaft 106 from gearbox 104 drives a turntable 108. A plurality of electromagnetic transducer heads 110 protrude from the turntable 108, and accordingly are rotated by the motor 100. The gearbox 104 has a second output shaft 112 with a gear 114 fixed thereto and meshing with gear 19. As shown in FIGURE 5, the magnetic tape 116 is pressed into contact with the heads 110 by pressure gate assembly 118; tape 116 then passes between drive roller 28 and the pressure roller 11.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

Having thus fully described the invention, what is claimed as new, and for which it is desired to secure Letter Patent, is:

1. In a synchronizing system for use with intelligence recording and reproducing apparatus having a rotary mounting supporting one or more transducer heads so that upon its rotation said heads sweep transversely across a magnetic tape being fed past said mounting thereby to produce a series of intelligence tracks running substantially transversely of said tape, in combination, a tape drive roller having a shaft extending past both ends of said roller, a synchronous motor, a power transmission member secured to said shaft, a spacing guide having incremental peripheral portions corresponding to the distance between intelligence tracks on said tape and journaled on said shaft adjacent said power transmission member, a drive gear journaled on said shaft and secured to said spacing guide, a second gear in constant mesh with said drive gear and driven by said motor, a guide-engaging element on said power transmission member selectively engageable with any incremental peripheral portion of said spacing guide and means for rotating said shaft independently of said drive gear whereby independent rotation of said shaft causes said tape to be moved by said roller a distance integral with the spacing of the tracks on said tape.

2. In a synchronizing system for use with intelligence recording and reproducing apparatus having a rotary mounting supporting a plurality of transducer heads so that upon its rotation said heads sweep transversely across a magnetic tape being fed thereover to produce a series of intelligence tracks running substantially transversely of said tape, the combination of tape feeding mechanism including a tape driving roller for moving said tape in a first direction during recording and playback, reversing means for said drive roller to feed said tape in the opposite direction for selective playback, and roller control means operatively connected with said reversing means for aligning said tracks with said heads, said roller control means including timing elements spaced apart a distance integrally and synchronously related with the distance between adjacent tracks, said roller control means including means responsive to the relative positions of said timing elements and said rotating heads to effect registry between one of said tracks and one of said heads when said reversing means ceases operation.

3. In a synchronizing system for use with intelligence recording and reproducing apparatus having a rotary mounting supporting a plurality of transducer heads so that upon its rotation said heads sweep transversely across a magnetic tape being fed past said mounting thereby to produce a series of intelligence tracks running substantially transversely of said tape, the combination of a roller mounted to frictionally drive said tape, driving means for moving said roller, timing elements spaced apart an amount corresponding to the distance between two adjacent tracks or a multiple thereof, and control means responsive to said timing elements for positioning said roller to bring one of said tracks into register with the path of sweeping movement of one of said transducer heads.

4. In a synchronizing system for use with intelligence recording and reproducing apparatus having a rotary mounting supporting a plurality of transducer heads so that upon its rotation said heads sweep transversely across a magnetic tape being fed thereover thereby to produce a series of intelligence tracks running substantially transversely of said tape, the combination of tape feeding mechanism including a tape driving roller for moving said tape past said rotary mounting during recording, a motor drive for said rotating heads having reversing means adapted to backfeed said tape in preparation for selective feedback, roller controlling means to effect registry between one of said tracks and one of said heads whenever said reversing means stops, said roller controlling means coacting with said reversing means and including timing elements, said timing elements being synchronized with said tracks and spaced apart a distance corresponding to the distance between two adjacent tracks or a multiple thereof, whereby when said backfeeding ceases a track will be in alignment with a transducer head.

5. In a synchronizing system for use with intelligence recording and reproducing apparatus having a rotary mounting supporting a plurality of transducer heads so that upon its rotation said heads sweep transversely across a magnetic tape being fed thereover thereby to produce a series of intelligence tracks running substantially transversely of said tape driving roller for moving said tape past said rotary mounting in a first direction, a tape reversing mechanism for moving said tape in the opposite direction, control means for driving said roller, and timing elements uniformly spaced a distance corresponding to the distance between two adjacent tracks or a multiple thereof and synchronized with said intelligence tracks, said control means being responsive to the relative positions of said timing elements and said rotating heads to effect registry between one of said tracks and one of said heads when said reversing means ceases operation.

6. In a synchronizing system for use with intelligence recording and reproducing apparatus having a rotary mounting supporting one or more transducer heads so that upon its rotation said heads sweep transversely across a magnetic tape being fed thereover thereby to produce a series of intelligence tracks running substantially transversely of said tape, the combination of a main tape feeding mechanism including a tape driving roller for moving said tape past said rotary mounting during recording, a motor drive for said roller, an auxiliary drive for said roller including a rotatable shaft, a toothed ratchet wheel having teeth spaced in predetermined relation to the tracks recorded on said tape secured to said motor drive, the increment of tape movement produced by the spacing between the teeth on said ratchet being equal to the distance between two adjacent tracks or a multiple thereof, a pawl secured to said shaft and spring means connected to said pawl to urge said pawl against said ratchet, whereby adjustment of said movable shaft may move said tape in increments determined by the spacing between the teeth of said ratchet.

References Cited in the file of this patent

UNITED STATES PATENTS

| | | |
|---|---|---|
| 2,678,821 | Masterson | May 18, 1954 |
| 2,714,010 | Gruber | July 26, 1955 |
| 2,773,120 | Masterson | Dec. 4, 1956 |
| 2,790,645 | Buhrendorf | Apr. 30, 1957 |
| 2,900,191 | Roberts | Aug. 18, 1959 |